United States Patent [19]

Lipsztajn et al.

[11] Patent Number: 4,915,927
[45] Date of Patent: Apr. 10, 1990

[54] PRODUCTION OF CHLORIC ACID

[75] Inventors: Marek Lipsztajn, Rexdale; Zbigniew Twardowski; Gerald Cowley, both of Mississauga, all of Canada

[73] Assignee: Tenneco Canada Inc., Isling, Canada

[21] Appl. No.: 260,500

[22] Filed: Oct. 21, 1988

[51] Int. Cl.⁴ ............................................. C01B 11/02
[52] U.S. Cl. ....................................... 423/472; 204/103
[58] Field of Search ............... 423/472, 475; 204/103, 204/82, 83

[56] References Cited

U.S. PATENT DOCUMENTS 2,811,420 10/1957 Pernert .................................. 23/152
3,695,839 10/1972 Callerame ............................. 423/479
3,810,969 5/1974 Schlumberger ..................... 423/475

Primary Examiner—Jeffrey E. Russel
Assistant Examiner—Stephen G. Kalinchak
Attorney, Agent, or Firm—Sim & McBurney

[57] ABSTRACT

Chloric acid is produced in an electrolytic-electrodialytic process in which chlorate ions from a sodium chlorate solution are transferred through an anion-exchange membrane to combine with electrolytically-produced hydrogen ions in a compartment of a cell, from which the resulting chloric acid is recovered. The sodium ions are transferred through a cation-exchange membrane to combine with electrolytically-produced hydroxyl ions in another compartment of the cell, from which the resulting sodium hydroxide is recovered.

9 Claims, 1 Drawing Sheet

PRODUCTION OF CHLORIC ACID

FIELD OF INVENTION

The present invention relates to the production of chloric acid, $HClO_3$.

BACKGROUND TO THE INVENTION

Chlorine dioxide is produced by reduction of a metal chlorate, usually sodium chlorate, in an acid aqueous reaction medium. The use of sodium chlorate requires the presence of a compensating anion and the production of a by-product sodium salt of the anion. For example, for the reaction of sodium chlorate and sodium chloride and sulphuric acid, the reaction is represented by the equation:

$$NaClO_3 + NaCl + H_2SO_4 \rightarrow ClO_2 + \tfrac{1}{2}Cl_2 + Na_2SO_4 + H_2O$$

It has long been suggested, for example, in U.S. Pat. No. 2,811,420, to use chloric acid as a substitute for a metal chlorate to produce chlorine dioxide, in view of the fact that the metal cation does not need compensating for, so that a reaction of chloric acid and hydrochloric acid would produce chlorine dioxide, chlorine, water and no other by-product, in accordance with the equation:

$$HClO_3 + HCl \rightarrow ClO_2 + \tfrac{1}{2}Cl_2 + H_2O$$

However, despite this evident advantage, there is no commercially-feasible process for producing chloric acid. One known preparative procedure involves reaction of barium chlorate with sulphuric acid, in accordance with the equation:

$$Ba(ClO_3)_2 + H_2SO_4 \rightarrow 2\ HClO_3 + BaSO_4$$

This procedure is highly impractical and introduces more problems, particularly the disposal of barium sulphate, than it solves.

It also has previously been suggested, in U.S. Pat. Nos. 3,695,839 and 3,810,969, to form chloric acid by using a cationic ion-exchange resin. However, such processes require periodic regeneration of the ion-exchange resin, which again produces an effluent stream for disposal. The ion-exchange resins tend to be unstable and are expensive.

SUMMARY OF INVENTION

In accordance with the present invention, chloric acid is formed by an electrolytic-electrodialytic process in a three- or four-compartment cell arrangement.

According to the invention, there is provided a method for the production of chloric acid, which comprises a plurality of steps. An aqueous chlorate solution is fed to an electrolytic-electrodialytic cell. Hydrogen ions are electrolytically formed in one compartment in the cell and chlorate ions are transferred from the feed of aqueous chlorate solution across an anion-exchange membrane into the one compartment to form chloric acid therein. The chloric acid is removed from the one compartment. Hydroxyl ions are electrolytically formed in another compartment in the cell and the cation of the chlorate is transferred from the feed of aqueous chlorate solution across a cation-exchange membrane into the another compartment to form a hydroxide of the cation. An aqueous hydroxide solution is removed from the another compartment. The aqueous chlorate solution is generally an aqueous sodium chlorate solution, so that the hydroxide formed is sodium hydroxide.

In one embodiment of the invention, the chloric acid is formed in a single-unit electrolytic-electrodialytic cell. In this embodiment, the one compartment of the cell in which the chloric acid is formed is the anode compartment and the another compartment of the cell in which the aqueous hydroxide solution is formed is the cathode compartment of the cell. The aqueous sodium chlorate solution is fed to a central compartment between the anode and cathode compartments and separated by the anionic and cationic membranes. Oxygen is co-produced with the chloric acid in the anode compartment and vented therefrom and hydrogen is co-produced with the aqueous hydroxide solution in the cathode compartment and is vented therefrom. The vented hydrogen may be employed as a fuel.

The overall cell reaction in this embodiment, therefore, is represented by the equation:

$$NaClO_3 + 3/2 H_2O \rightarrow HClO_3 + NaOH + \tfrac{1}{4}O_2 + \tfrac{1}{2}H_2$$

The anode compartment may be divided into two sub-compartments by a cation-exchange membrane, which defines a first sub-compartment adjacent the anion-exchange membrane across which the chlorate ions are transferred and a second sub-compartment in which the anode is located. With this arrangement, the electrolytically-produced hydrogen ions are transferred from the second sub-compartment in which they are formed by the electrolysis to the first sub-compartment to form the chloric acid herein with the chlorate ions transferred across the anion-exchange membrane and the chloric acid product is removed from the first sub-compartment. The oxygen co-produced with the hydrogen ions is vented from the second sub-compartment.

An arrangement in which the anode compartment is divided into two sub-compartments as described above may be employed to avoid any possibility of electrolysis of the chlorate ions to perchlorate.

In another embodiment of the invention, the chloric acid is formed in a plurality of unit cells, with each unit being separated from the adjacent ones by bipolar membranes. The bipolar membranes have an anionic face in the one compartment of one cell and a cationic face in the another compartment of an adjacent cell. The aqueous sodium chlorate solution is fed to a central compartment between the one compartment and the another compartment in each of the individual cells which are separated by the anionic and cationic membranes.

With the plurality of cells separated by bipolar membranes, gaseous evolution does not take place in the one and another compartments. The overall reaction is represented by the equation:

$$NaClO_3 + H_2O \rightarrow HClO_3 + NaOH$$

The plurality of cells is terminated at one end by an anodic unit and at the other end by a cathodic unit. A single electrical current feed, therefore, is employed to result in a large volume production of chloric acid in parallel from the plurality of unit cells, with gaseous evolution occurring only in the end anode and cathode compartments.

Bipolar membranes and their operation are well known and are described, for example, in U.S. Pat. Nos. 4,024,043, 4,140,815, 4,057,481, 4,355,116, 4,116,889, 4,253,900, 4,584,246 and 4,673,454 and reference may be had to such patents for details thereof.

In the process of the invention, therefore, sodium chlorate is split into its component ionic species by transfer of chlorate ions across an anion-exchange membrane to an adjacent compartment and transfer of sodium ions across a cation-exchange membrane to an adjacent compartment. In these adjacent compartments, the respective ionic species of the original sodium chlorate combine with electrolytically-produced hydrogen and hydroxyl ions to form the two products, namely chloric acid and sodium hydroxide.

The chloric acid so formed is useful in the generation of chlorine dioxide in processes which do not produce a by-product salt of lower value, such as is typically formed in chlorine dioxide generating processes employing sodium chlorate, for example, sodium sulfate.

The by-product sodium hydroxide is a valuable commodity, being widely used in pulp mills for the purification of pulp in pulp bleach plant operations. By the process of the invention, therefore, the cation of the chlorate is provided in a useful, ready-usable form, namely aqueous sodium hydroxide solution.

The process of the invention requires a feed of sodium chlorate and water only along with a feed of electrical power to produce the two valuable products, namely chloric acid and aqueous sodium hydroxide solution.

While the present invention is particularly described with respect to the formation of chloric acid from sodium chlorate, the process is applicable to any water-soluble chlorate which has a cation capable of forming a water-soluble hydroxide.

DESCRIPTION OF PREFERRED EMBODIMENTS

Figure 1:
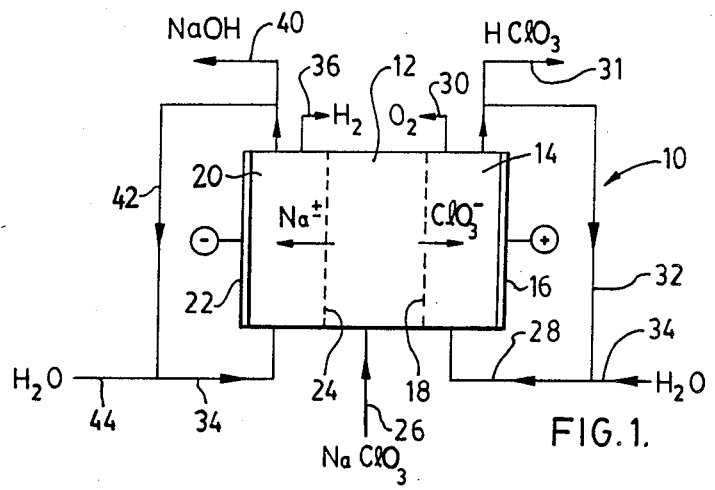
FIG. 1 is a schematic flow sheet of a chloric acid- and sodium hydroxide-producing process in accordance with one embodiment of the invention.

Referring first to FIG. 1, there is shown therein an electrolytic-electrodialytic cell 10 which is divided into three compartments by ion-exchange membranes. A central compartment 12 is separated from an anode compartment 14 in which is located a cell anode 16 by an anion-exchange membrane 18 and from a cathode compartment 20 in which is located a cell cathode 22 by a cation-exchange membrane 24.

The anion-exchange membrane 18 is formed of any convenient anion-exchange material which permits anions to selectively pass therethrough in preference to cations, is stable to strong oxidant in acid media and also resists leakage of hydrogen ions from the anode compartment 14 to the central compartment 12. One suitable material which can be used is perfluorinated polymeric material having pendant anion-exchange functional groups.

The cation-exchange membrane 24 may be formed of any convenient material which enables cations to selectively pass therethrough in preference to anions. Preferably, the cation-exchange membrane 24 is formed of perfluorocarbon polymer having pendant cation-exchange functional groups, such as those sold under the trademark "NAFION".

Aqueous sodium chlorate solution is fed by line 26 to the central compartment 12 of the cell 10. The aqueous sodium chlorate solution may have a concentration of about 0.001 to about 8 molar, preferably about 0.1 to about 6 molar. From the central compartment 12, chlorate ions are transported under the influence of the electrical current passing between cathode and anode by the anion-exchange membrane 18 to the anode compartment 14 while sodium ions similarly are transported by the cation-exchange membrane 24 to the cathode compartment 20.

After an initial charge of an oxyacid, such as sulphuric acid or, preferably, chloric acid, water is fed by line 28 to the anode compartment 14, wherein the water is electrolyzed to oxygen, which is vented by line 30, and hydrogen ions, which combined with the chlorate ions which have migrated across the anion-exchange membrane to form chloric acid, which is recovered as product in line 31, with anolyte being recycled by line 32 to the water feed line 28, while make-up water is added by line 34.

After an initial charge of alkali, such as sodium hydroxide, to the cathode compartment 20, water is fed by line 36 to the cathode compartment 20, wherein it is electrolyzed to form hydrogen which is vented by line 38, and hydroxyl ions. The hydroxyl ions combine with the sodium ions transferred across the cation-exchange membrane 24 to form sodium hydroxide, which is removed from the cathode compartment as a product stream in line 40, with catholyte being recycled by line 42 to the water feed line 36, which make-up water is added by line 44.

The electrolytic process carried out in the cell 10 may be effected under any desired electrolytic conditions, generally at a membrane current density of about 0.01 to about 10 kA/m$^2$, preferably about to about 5 kA/m$^2$.

The process may be carried out over a wide temperature range, generally about 0° to about 150° C., preferably about 15° to about 90° C.

The electrolytic conditions are chosen to provide the desired concentration of chloric acid, which is generally up to about 40 wt. %, since chloric acid tends to be unstable at higher concentrations. Usually, the process is effected to produce a chloric acid concentration in the range of about 5 to about 35 wt. %.

The ion-exchange membranes 18 and 24 preferably are of high selectivity with respect to the transfer of ionic species therethrough, otherwise current inefficiencies result, and some neutralization of sodium hydroxide product and acidification feed sodium chlorate may occur.

The process shown in FIG. 1, therefore, produces chloric acid and aqueous sodium hydroxide solution from sodium chlorate and water, in accordance with the equation.

$$NaClO_3 + 3/2 H_2O \rightarrow HClO_3 + NaOH + \tfrac{1}{2}O_2 + \tfrac{1}{2}H_2$$

Figure 2:
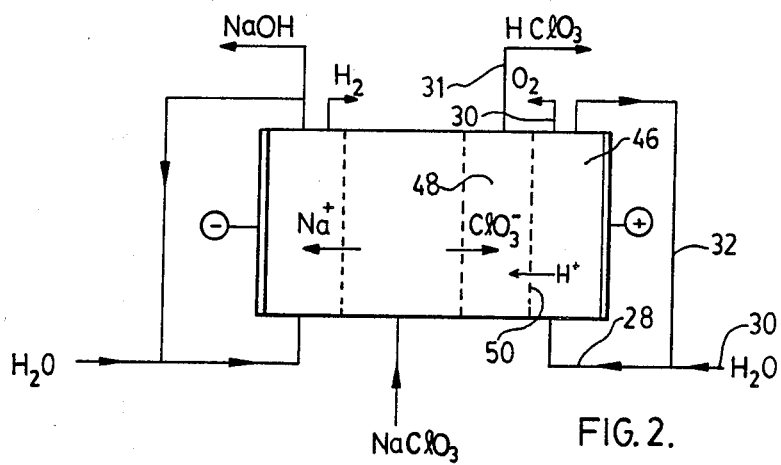
FIG. 2 is a schematic flow sheet of a chloric acid- and sodium hydroxide-producing process in accordance with another embodiment of the invention.

In the embodiment of FIG. 2, the anode compartment 14 is divided into two sub-compartments 46 and 48 by a further cation-exchange membrane 50, so that there is a decreased possibility of electrolysis of chlorate ions by the anode. With this arrangement, water fed by line 28 is electrolyzed in the sub-compartment and is transported by the cation-exchange membrane 50, which may be of the same type as membrane 24, to the sub-compartment 48 to combine with the chlorate ions to form the chloric acid product in line 31. Anolyte for recycle by line 32 is removed from the sub-compartment 46. Other features of the cell are as described above with respect to FIG. 1.

Figure 3:
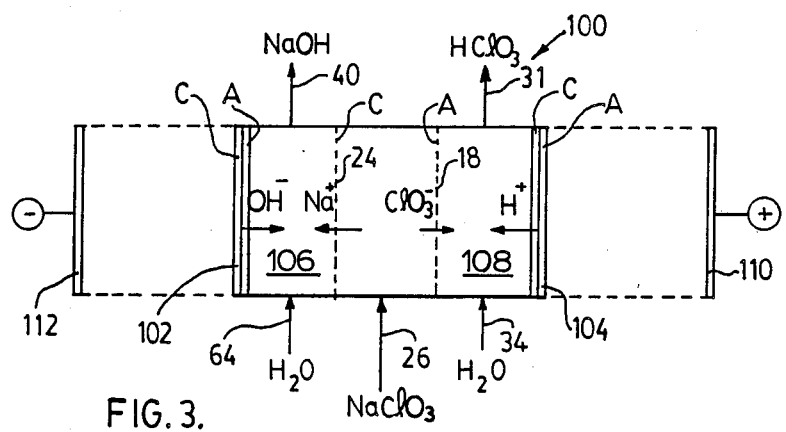
FIG. 3 is a schematic flow sheet of a chloric acid- and sodium hydroxide-producing process in accordance with a further embodiment of the invention.

Referring now to FIG. 3, there is shown therein the utilization of a bank of cells with the individual cells 100 producing chloric acid in line 31 and sodium hydroxide in line 40 from an aqueous sodium chlorate feed in line 26 and water feeds by lines 34 and 44. The various product streams from the individual cells may be recirculated, as described.

Each unit cell 100 is separated from each adjacent unit cell by bipolar membranes 102 and 104, having an anodic face A, and a cathodic face C''. The number of unit cells in the bank of cells may vary widely, depending on the required production capacity and typically may vary from about 20 to about 500.

The bipolar membrane 102 has its anionic face facing the cation-exchange membrane 24, so as to form hydroxyl ions under the electric field applied thereto, thereby forming sodium hydroxide in the compartment 106 with the sodium ions transported across the cation-exchange membrane.

The bipolar membrane 104 has its cationic face facing the anion-exchange membrane 18, so as to form hydrogen ions under the electric field applied thereto, thereby forming chloric acid in the compartment 108 with the chlorate ions transported across the anion-exchange membrane.

The cationic side of bipolar membrane 102 faces the anion-exchange membrane in the next-adjacent unit cell 100 to that side while the anionic side of bipolar membrane 104 faces the cation-exchange membrane in the next-adjacent unit cell 100 to that side.

There are no gaseous by-products formed in the compartments 106 and 108, since the hydroxyl and hydrogen ions respectively are formed by water-splitting by the bipolar membranes 102 and 104, rather than at electrodes in the embodiment of FIG. 1.

Only a single anode 110 and single cathode 112 is required for the bank of unit cells 100. Oxygen and hydrogen respectively are formed at the electrode surfaces.

With the arrangement of FIG. 3, a single power source and only one pair of electrodes are required for the multiple number of unit cells 100, with by-product gases being formed only at the electrode plates. The various process parameters discussed above with respect to the embodiment of FIG. 1 apply equally with respect to each unit cell 100 in the embodiment of FIG. 3.

EXAMPLES

An electrodialytic-electrolytic cell of the type generally illustrated in FIG. 1 set up with a Nafion cation-exchange membrane and a SA48 (Tosoh Corporation, Japan) anion-exchange membrane, nickel cathode and an oxygen-DSA anode, each having a cross-sectional area of 100 cm$^2$. Initial volumes of 500 ml of alkali, 500 ml of sodium chlorate solution and 500 ml of sulfuric acid were charged respectively to the anode, central and cathode compartments of the cell and experiments were carried out in batch manner on these liquid volumes.

A series of batch experiments was carried out to investigate the effect of feed concentration, temperature and current density and the results of the experiments are reproduced in the following Table:

TABLE

| No. | Current Density [kA/m$^2$] | Charge Passed [A·s] | Cell Voltage [V] initial | Cell Voltage [V] final | Anode compartment H$^+$ initial | Anode compartment H$^+$ final | Anode compartment ClO$_3^-$ final | Middle compartment Na$^+$ in ppm final | Middle compartment H$^+$ final | Middle compartment ClO$_3^-$ initial | Middle compartment ClO$_3^-$ final | Cathode Compartment OH initial | Cathode Compartment OH final | Cathode Compartment ClO$_3^-$ final | Amount of Generated HClO$_3$ in [mmoles] | Balance on ClO$_3^-$ % | Current Efficiency % |
|---|---|---|---|---|---|---|---|---|---|---|---|---|---|---|---|---|---|
| 1 | 1.0 | 211,500 | 6.65 | 4.92 | 0.97 | 2.45 | 1.55 | 105 | 1.26 | 4.90 | 4.54 | 0.97 | 3.08 | 0.02 | 814 | 99 | 37 |
| 2 | 1.0 | 116,800 | 12.0 | 5.46 | 0.10 | 1.14 | 1.08 | 75 | 0.2 | 1.60 | 0.63 | 0.96 | 1.93 | 0.004 | 571 | 100 | 47 |
| 3 | 1.0 | 168,200 | 11.8 | 16.6 | 0.10 | 1.48 | 1.40 | 35 | 0 | 1.57 | 0.01 | 0.98 | 2.08 | 0.003 | 762 | 99 | 44 |
| 4 | 3.0 | 213,200 | 21.4 | 7.09 | 0.10 | 1.98 | 1.94 | 70 | 1.2 | 4.88 | 4.35 | 0.97 | 3.28 | 0.009 | 1075 | 100 | 49 |
| 5 | 4.0 | 561,600 | 16.9 | 7.93 | 0.97 | 4.44 | 3.61 | 120 | 1.8 | 4.93 | 4.67 | 0.98 | 5.26 | 0.013 | 2103 | 100 | 36 |

As may be seen from the results reproduced in this Table, a good performance was observed at current densities as high as 4 kA/m$^2$. Even at very low concentrations of sodium chlorate, a good performance was observed. For the batch process, a gradual depletion of sodium chlorate content of the central compartment was observed without any significant loss of performance. Due to transport of water across the membrane, the volume of the feeding solution decreased while the volumes of the receiving solutions increased.

The anode compartment also was tested for the perchlorate and the concentration observed indicates that the conversion of chlorate to perchlorate in the anode compartment was not significant.

SUMMARY OF DISCLOSURE

In summary of this disclosure, the present invention provides a novel and efficient process for the production of chloric acid, useful in the production of chlorine dioxide for pulp bleach plant and other applications, which also produces sodium hydroxide or other aqueous metal hydroxide as a valuable by-product. Modifications are possible within the scope of this invention.

What we claim is:

1. A method for the production of chloric acid, which comprises:
   feeding an aqueous chlorate solution to an electrolytic-electrodialytic cell,
   electrolytically forming hydrogen ions in one compartment in said cell and transferring chlorate ions from said feed of aqueous chlorate solution across an anion-exchange membrane into said one compartment to form chloric acid therein,
   removing chloric acid from said one compartment, electrolytically forming hydroxyl ions in another compartment in said cell and transferring the cation of said chlorate from said feed of aqueous chlorate solution across a cation-exchange membrane into said another compartment to form a hydroxide of said cation, and removing an aqueous hydroxide solution from said another compartment.

2. The method of claim 1 wherein said aqueous chlorate solution is an aqueous solution of sodium chlorate.

3. The method of claim 2, wherein said electrolytic-electrodialytic cell is a single unit cell, said one compartment of said cell is the anode compartment of the cell and said another compartment of said cell is the cathode compartment of the cell, said aqueous sodium chlorate solution is fed to a central compartment between said anode and cathode compartments and separated by said anionic and cationic membranes, oxygen is co-produced with said chloric acid in said anode compartment and is vented therefrom and hydrogen is co-produced with said aqueous sodium hydroxide in said cathode compartment and is vented therefrom.

4. The method of claim 3 wherein said anode which defines a first sub-compartment adjacent said anion-exchange membrane across which said chlorate ions are transferred and a second sub-compartment in which the cell anode is located, hydrogen ions electrolytically-produced in said second sub-compartment are transferred to said first sub-compartment to form said chloric acid therein, and said chloric acid is removed from said first sub-compartment.

5. The method of claim 2 wherein said cell is a multiple unit cell comprising a plurality of individual cells each containing said one compartment and said another compartment and separated from the next adjacent one of said units by a bipolar membrane which has an anionic face in said one compartment of one cell and a cationic face in said another compartment of an adjacent cell, and said aqueous sodium chlorate solution is fed to a central compartment between said one compartment and said another compartment in each said individual cells and separated by said anionic and cationic membranes.

6. The method of claim 2 wherein said aqueous sodium chlorate solution has a concentration of about 0.001 to about 8 molar.

7. The method of claim 6 wherein said concentration is about 0.1 to about 6 molar.

8. The method of claim 6 wherein said process is effected at a membrane current density of about 0.01 to about 10 kA/m$^2$.

9. The method of claim 8 wherein said current density is about 1 to about 5 kA/m$^2$.

* * * * *